(12) United States Patent
Ge et al.

(10) Patent No.: US 8,392,660 B2
(45) Date of Patent: Mar. 5, 2013

(54) CACHE SYSTEM INCLUDING A PLURALITY OF PROCESSING UNITS

(75) Inventors: Yi Ge, Kawasaki (JP); Shinichiro Tago, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 12/453,782

(22) Filed: May 21, 2009

(65) Prior Publication Data
US 2009/0235030 A1 Sep. 17, 2009

Related U.S. Application Data

(63) Continuation of application No. PCT/JP2006/323918, filed on Nov. 30, 2006.

(51) Int. Cl.
*G06F 12/00* (2006.01)
(52) U.S. Cl. .......... 711/133; 711/119; 711/129
(58) Field of Classification Search .......... 711/118, 711/129, 133–135, 119
See application file for complete search history.

(56) References Cited

U.S. PATENT DOCUMENTS

| | | | | |
|---|---|---|---|---|
| 5,590,308 | A * | 12/1996 | Shih | 711/136 |
| 6,415,364 | B1 * | 7/2002 | Bauman et al. | 711/155 |
| 2004/0059875 | A1 * | 3/2004 | Garg et al. | 711/141 |
| 2005/0102475 | A1 * | 5/2005 | Reohr et al. | 711/128 |
| 2006/0179235 | A1 | 8/2006 | Bell, Jr. et al. | |

FOREIGN PATENT DOCUMENTS

| | | |
|---|---|---|
| JP | 59-3773 | 1/1984 |
| JP | 2003-50742 | 2/2003 |
| WO | 02/19115 A2 | 3/2002 |

OTHER PUBLICATIONS

United Kingdom Office Action issued Jan. 5, 2011 in corresponding United Kingdom Patent Application GB0908855.0.
International Search Report for International Application No. PCT/JP2006/323918, mailed Jan. 9, 2007.

* cited by examiner

*Primary Examiner* — Jared Rutz
*Assistant Examiner* — Gurtej Bansal
(74) *Attorney, Agent, or Firm* — Staas & Halsey LLP

(57) ABSTRACT

A cache system includes processing units operative to access a main memory device, caches coupled in one-to-one correspondence to the processing units, and a controller coupled to the caches to control data transfer between the caches and data transfer between the main memory and the caches, wherein the controller includes a memory configured to store first information and second information separately for each index, the first information indicating an order of oldness of entries in each one of the caches, and the second information indicating an order of oldness of entries for the plurality of the caches, and a logic circuit configured to select an entry to be evicted and its destination in response to the first and second information when an entry of an index corresponding to an accessed address is to be evicted from a cache corresponding to the processing unit that accesses the main memory device.

7 Claims, 13 Drawing Sheets

FIG.10

| CORE | OPERATION | CYCLE (1~) | | | | | | | | | | | | | | | | |
|---|---|---|---|---|---|---|---|---|---|---|---|---|---|---|---|---|---|---|
| OPERATION OF SELF-CORE CACHE | TRANSMIT ADDRESS TO ICC | ■ | | | | | | | | | | | | | | | | |
| | RECEIVE DATA READ FROM MEMORY | | | | | | SEVERAL HUNDRED CYCLES | | | | | | | | | | | |
| OPERATION OF CACHE CONTROLLER | CHECK WHETHER OLDEST ENTRY OF ALL IS IN SELF-CORE CACHE | | | ■ | | | | | | | | | | | | | | |
| | UPDATE LRU INFORMATION | | | ■ | | | | | | | | | | | | | | |
| | REQUEST MEMORY TO PROVIDE DATA | | | | ■ | | | | | | | | | | | | | |
| | RECEIVE DATA FROM MEMORY | | | | | | | | | | ■ | ■ | | | | | | |
| | TRANSFER DATA TO SELF-CORE CACHE | | | | | | | | | | | | | | | | | |
| OTHER CACHE OPERATION | — | | | | | | | | | | | | | | | | | |

| LRU INFORMATION TO BE UPDATED | OPERATION |
|---|---|
| FIRST LRU INFORMATION 41 | CHANGE OLDEST ENTRY IN SELF-CORE CACHE TO NEWEST |
| SECOND LRU INFORMATION 42 | CHANGE OLDEST ENTRY OF ALL TO NEWEST ENTRY |

FIG.13

| CORE | OPERATION | CYCLE (1~) | | | | | | | | | | | | | | |
|---|---|---|---|---|---|---|---|---|---|---|---|---|---|---|---|---|
| | | | | | | | | | SEVERAL HUNDRED CYCLES | | | | | | | |
| OPERATION OF SELF-CORE CACHE | TRANSMIT ADDRESS TO ICC | ■ | | | | | | | | | | | | | | |
| | TRANSFER OLDEST ENTRY DATA IN SELF-CORE CACHE TO ICC | | | ■ | | | | | | | | | | | | |
| | RECEIVE DATA READ FROM MEMORY | | | | | | | ■ | | | | | | | | |
| OPERATION OF ANOTHER CORE CACHE | REPLACE OLDEST ENTRY OF ALL WITH OLDEST ENTRY OF SELF-CORE CACHE | | | | | ■ | | | | | | | | | | |
| OPERATION OF CACHE CONTROLLER | CHECK WHETHER OLDEST ENTRY OF ALL IS IN SELF-CORE CACHE | | ■ | | | | | | | | | | | | | |
| | REQUEST SELF-CORE CACHE TO PROVIDE OLDEST ENTRY OF SELF-CORE CACHE | | ■ | | | | | | | | | | | | | |
| | UPDATE LRU INFORMATION | | | | | ■ | | | | | | | | | | |
| | REQUEST MEMORY TO PROVIDE DATA | | | | ■ | | | | | | | | | | | |
| | TRANSFER OLDEST ENTRY DATA OF SELF-CORE CACHE TO ANOTHER CORE CACHE | | | | ■ | | | | | | | | | | | |
| | RECEIVE DATA FROM MEMORY | | | | | | | | | | | | ■ | ■ | | |
| | TRANSFER DATA TO SELF-CORE CACHE | | | | | | ■ | | | | | | | | | |
| OTHER CACHE OPERATION | — | | | | | | | | | | | | | | | |

FIG.14

| LRU INFORMATION TO BE UPDATED | OPERATION |
|---|---|
| FIRST LRU INFORMATION 41 OF SELF-CORE CACHE | CHANGE OLDEST ENTRY IN SELF-CORE CACHE TO NEWEST |
| FIRST LRU INFORMATION 41 OF ANOTHER CORE CACHE | COMPUTE OLDNESS SEQUENCE NUMBER OF OLDEST ENTRY OF SELF-CORE CACHE AS DEFINED AMONG ENTRIES OF ANOTHER CORE CACHE, AND CHANGE OLDEST ENTRY OF ANOTHER CORE CACHE TO NEXT OLDER SEQUENCE NUMBER |
| SECOND LRU INFORMATION 42 | CHANGE OLDEST ENTRY OF ALL TO ENTRY HAVING NEXT OLDER SEQUENCE NUMBER THAN OLDEST ENTRY OF SELF-CORE CACHE |
| | CHANGE OLDEST ENTRY OF SELF-CORE CACHE TO NEWEST ENTRY |

FIG.15

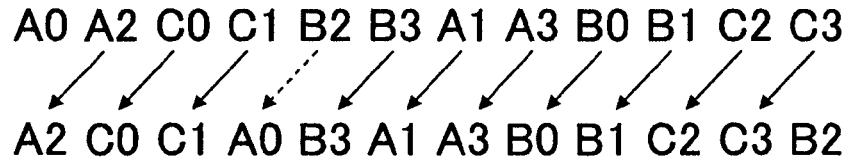

FIG.16A
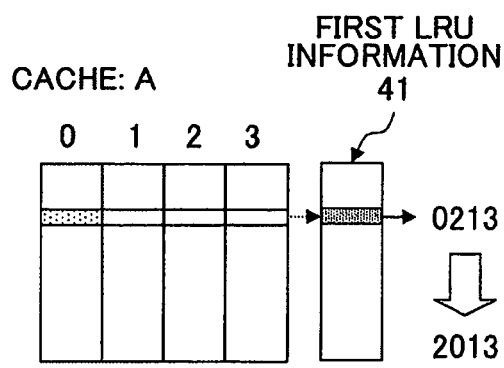
FIG.16B
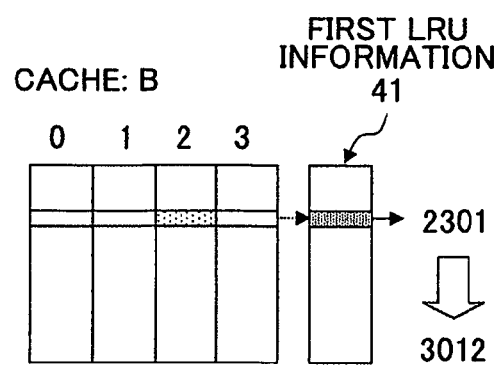
FIG.17
AACCBBAABBCC
⇩
ACCABAABBCCB

CACHE SYSTEM INCLUDING A PLURALITY OF PROCESSING UNITS

CROSS-REFERENCE TO RELATED APPLICATIONS

This is a continuation of International Application No. PCT/JP2006/323918, filed on Nov. 30, 2006, the entire contents of which are hereby incorporated by reference.

FIELD

The disclosures herein generally relate to a memory system, and particularly relate to a cache system.

BACKGROUND

In computer systems, generally, a cache memory that is smaller in capacity and faster than the main memory is provided in addition to the main memory. Part of the information stored in the main memory is copied to the cache. When this information needs to be accessed, a faster retrieval of information is attained by reading the information from the cache rather than from the main memory.

The cache contains a plurality of cache lines, and the copying of information from the main memory to the cache is performed on a cache-line-specific basis. The memory space of the main memory is divided in units of cache lines. The divided memory segments are sequentially assigned to the cache lines. Since the volume of the cache is smaller than the volume of the main memory, the memory segments of the main memory are repeatedly assigned to the same cache lines.

When a first access is performed with respect to a given address in memory space, information (data or program) stored at this address is copied to a corresponding cache line provided in the cache. When a next access is performed with respect to the same address, the information is retrieved directly from the cache. In general, a predetermined number of lower-order bits of an address serve as an index for caching, and the remaining higher-order bits serve as a cache tag.

When data is to be accessed, the index portion of the address to be accessed is used to read the tag of a corresponding index provided in the cache. A check is then made as to whether the retrieved tag has a matching bit pattern with the tag portion of the address. If there is no match, a cache miss is detected. If there is a match, a cache hit is detected, resulting in the cache data (data of a predetermined number of bits equal in size to one cache line) corresponding to this index being accessed.

A cache configuration in which only one tag is provided for each cache line is called a direct mapping system. A cache configuration in which N tags are provided for each cache line is called an N-way set-associative system. The direct mapping system may be regarded as a one-way set-associative system.

A system which employs a cache memory hierarchy is used for the purpose of reducing a penalty associated with accessing the main memory when a cache miss occurs. A secondary cache that is accessible at faster speed than the main memory may be provided between the primary cache and the main memory. With this configuration, it is possible to lower the frequency of occurrences that the access to the main memory may become necessary upon the occurrence of a cache miss at the primary cache, thereby reducing a cache miss penalty.

Conventionally, increases in the processing speed of processors have been achieved by increasing their operating frequencies and by improving their architectures. In recent years, however, a technological limit to a further frequency increase has been beginning to be perceived. There has thus been a shift towards the use of a multiprocessor configuration using a plurality of processors for the purpose of increasing processing speed.

A system having a plurality of processors may be implemented by providing a plurality of conventional single processor cores each having a cache and by connecting these in a straightforward manner. While such a configuration may reduce design cost, there may be a problem in its cache utilization rate and cache consistency.

The applicant of the present application has provided a shared distributed cache mechanism as a solution to the above-noted problem. In this mechanism, each processor has a cache, and a given processor may utilize another processor's cache as a lower level cache situated under its own cache.

FIG. 1 is a drawing illustrating an example of the configuration of a shared distributed cache system. The shared distributed cache system illustrated in FIG. 1 includes a plurality of cores (i.e., processors) 11 through 13, a plurality of caches 14 through 16 provided in one-to-one correspondence to the cores 11 through 13, an inter-cache connection controller 17 connected to the caches 14 through 16, and a main memory 18. The cores 11 through 13 may access the caches (i.e., self-core caches) 14 through 16 connected directly thereto, respectively, as a primary cache. In this shared distributed cache system, provision is made such that another core's cache may be accessed as a secondary cache. Namely, when viewed from the core 10, the cache 14 is accessible as a primary cache, and the caches 15 and 16 are accessible as secondary caches. A path through which a secondary cache is accessed is provided through the inter-cache connection controller 17.

FIG. 2 is a flowchart illustrating a data load access operation performed in the shared distributed cache system illustrated in FIG. 1. In operation S1 of FIG. 2, one of the cores 11 through 13 issues a load request to the cache (i.e., self-core cache) directly connected thereto.

In operation S2, the cache that has received the load request checks whether the requested data resides in the cache, i.e., checks whether the access is a cache hit. In the case of a cache hit, the requested data is read from the self-core cache in operation S3 to be transmitted to the core that has issued the load request.

If a cache miss is detected in operation S2, the procedure goes to operation S4. In operation S4, a check is made as to whether a lower level cache exists under the cache for which the cache miss is detected. When the procedure goes to operation S4 upon detecting a cache miss in operation S2, the cache for which the cache miss is detected is one of the caches 14 through 16. In this case, thus, the two remaining caches may serve as lower level caches. If a lower level cache exists, the procedure goes to operation S5.

In operation S5, another core's cache that is situated in a next lower cache level is accessed. In operation S6, the cache that has received the access request checks whether the requested data resides in the cache, i.e., checks whether the access is a cache hit. In the case of a cache miss, the procedure goes back to operation S4 to repeat the subsequent operations.

If a cache hit is detected in operation S6, the procedure goes to operation S7. In operation S7, a check is made as to whether the cache data is to be moved. When the cache data is to be moved, an accessed cache line (i.e., accessed data) is moved in operation S8 from the cache-hit cache to the self-core cache, followed by transmitting the data to the core. In so doing, a cache line that is evicted from the self-core cache upon moving the accessed cache line to the self-core cache is moved to another core. If it is ascertained in operation S7 that the cache data is not to be moved, the accessed data is transmitted from the cache-hit cache to the core that has issued the load request.

If it is ascertained in operation S4 that a lower level cache does not exist, the procedure goes to operation S10. When the procedure goes to operation S4 upon detecting a cache miss in operation S6, the cache for which the cache miss is detected may be the lowest level cache. In this case, only the main memory 18 exists under this level. In such a case, the requested data is read from main memory 18 in operation S10 to be allocated to the self-core cache (i.e., the requested data corresponding to one cache line is copied to the self-core cache), followed by transmitting the data to the core that has issued the load request. A cache line that is evicted from the self-core cache as a result of this operation is moved to a lower level cache, for example.

In the operation flow described above, operations S7 through S9 relate to data transmission between caches, and operation S10 relates to data transmission between a memory and a cache.

In the operation performed in operation S10, the entries corresponding to an accessed index may be all used in the self-core cache. In such a case, one of these cache entries may need to be evicted in order to allocate the accessed data. This may require that a cache entry to be evicted be selected according to some criteria. Further, there may be a need to determine based on some criteria which entry of which cache is to be used as a destination of the cache entry that is evicted. There is also an option of discarding the cache entry that is evicted. These choices are preferably made so as to improve the cache utilization rate, and, also, the eviction and transmission operations are preferably performed in an efficient manner.

[Patent Document 1] Published Japanese Translation of PCT Application No. 2004-511840

[Patent Document 2] Japanese Patent Application Publication No. 59-003773

SUMMARY

According to an aspect of the embodiment, a cache system includes a plurality of processing units operative to access a main memory device, a plurality of caches coupled in one-to-one correspondence to the processing units, and a controller coupled to the caches to control data transfer between the caches and data transfer between the main memory and the caches, wherein the controller includes a memory configured to store first information and second information separately for each index, the first information indicating an order of oldness of entries in each one of the caches, and the second information indicating an order of oldness of entries for the plurality of the caches, and a logic circuit configured to select an entry to be evicted and a destination of the evicted entry in response to the first information and the second information when an entry of an index corresponding to an accessed address is to be evicted from a cache corresponding to one of the processing units that accesses the main memory device or a lower-level cache.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a drawing illustrating the relationships between each operation of the operation of FIG. 9 and system clock cycles;

FIG. 13 is a drawing illustrating the relationships between each operation of the operation of FIG. 12 and system clock cycles;

FIG. 14 is a drawing for explaining an update of the LRU information in the case of transferring an evicted entry;

FIG. 15 is a drawing illustrating the way all the entries of an index of interest are arranged in an order of oldness as defined with respect to the entire set;

FIG. 16A is a drawing illustrating the way the second LRU information is updated with respect to another core cache;

FIG. 16B is a drawing illustrating the way the second LRU information is updated with respect to a self-core cache; and FIG. 17 is a drawing illustrating a change in the second LRU information in the case of entries being updated upon data movements as illustrated in FIG. 15.

DESCRIPTION OF EMBODIMENTS

In the following, embodiments will be described with reference to the accompanying drawings.

Figure 3:
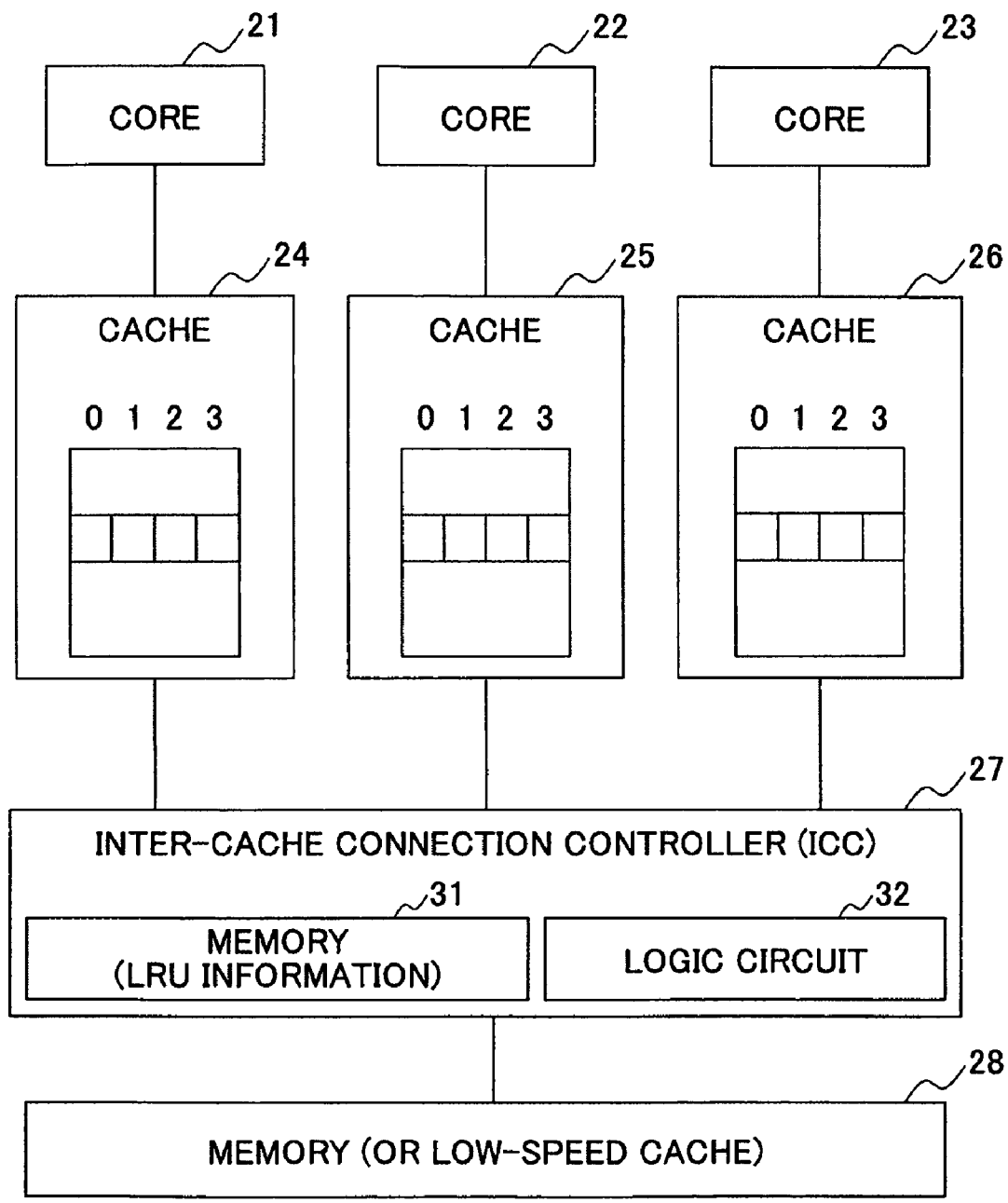
FIG. 3 is a drawing illustrating an example of the configuration of a shared distributed cache system.

FIG. 3 is a drawing illustrating an example of the configuration of a shared distributed cache system. A shared distributed cache system 20 illustrated in FIG. 3 includes a plurality of cores (i.e., processors) 21 through 23, a plurality of caches 24 through 26 provided in one-to-one correspondence to the cores 21 through 23, an inter-cache connection controller 27 connected to the caches 24 through 26, and a main memory 28. It is noted that low-speed caches, i.e., lower level caches than the caches 24 through 26, may be provided in place of the main memory 28 illustrated in FIG. 3, with a main memory being situated at a further lower level.

The cores 21 through 23 serve as processing apparatuses to access the main memory (or low-speed cache) 28. The cores 21 through 23 may process data read from the accessed address, and may write the processed data to the same access address as the read address or another access address. The caches 24 through 26 are small-capacity, high-speed memory devices that are connected in one-to-one correspondence to the cores 21 through 23. The cores 21 through 23 may access the caches 24 through 26 faster than the main memory 28. The inter-cache connection controller 27 is connected to the caches 24 through 26. The inter-cache connection controller 27 controls data transfer between the caches 24 through 26 as well as data transfer between the main memory 28 and the caches 24 through 26.

Figure 1:
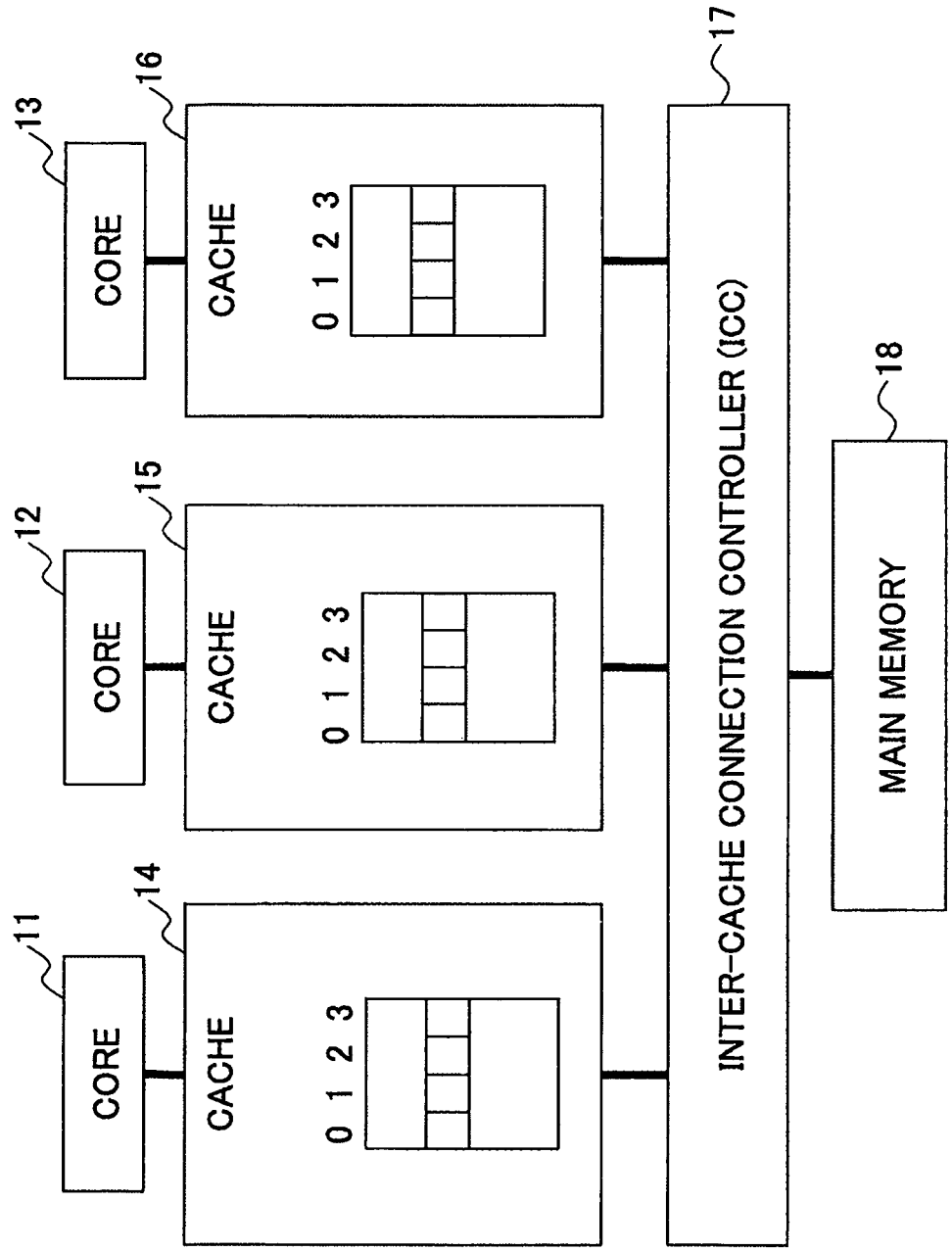
FIG. 1 is a drawing illustrating an example of the configuration of a shared distributed cache system.
Figure 2:
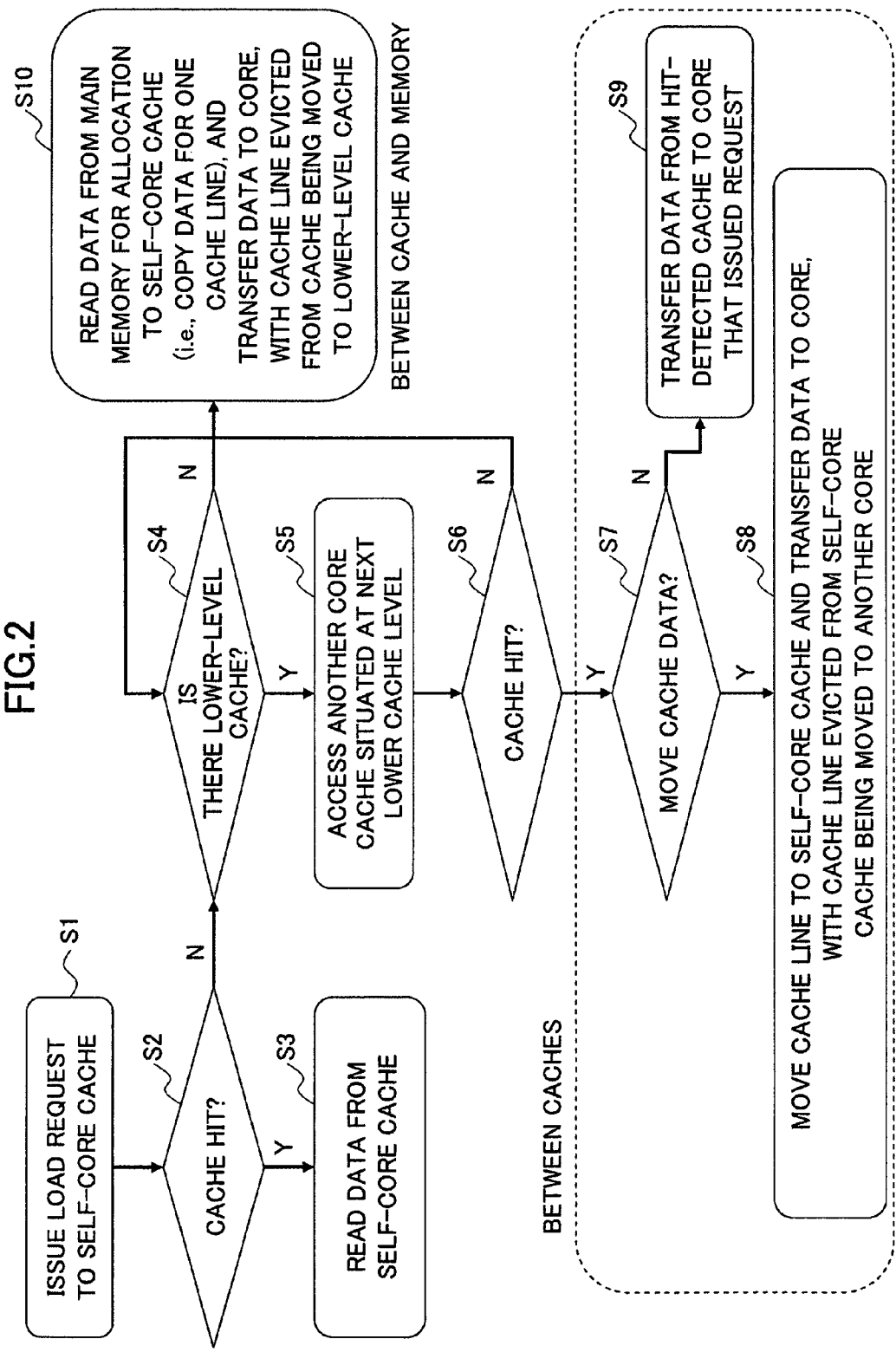
FIG. 2 is a flowchart illustrating a data load access operation performed in the shared distributed cache system illustrated in FIG. 1.

Data access operations in the shared distributed cache system 20 are performed by use of a similar procedure to the procedure illustrated in the flowchart of FIG. 2. Through such data access operations, the cores 21 through 23 may access the caches (i.e., self-core caches) 24 through 26 connected directly thereto, respectively, as a primary cache, and may also access another core's cache as a secondary cache. Namely, when viewed from the core 20, the cache 24 is accessible as a primary cache, and the caches 25 and 26 are accessible as secondary caches. In other words, secondary caches are accessible as low level caches. A path through which a secondary cache is accessed is provided through the inter-cache connection controller 27.

The inter-cache connection controller 27 illustrated in FIG. 3 includes a memory (i.e., register) 31 for storing LRU information and a logic circuit 32 for controlling cache entry movements based on the LRU information stored in the memory 31. The term "LRU" stands for Least Recent Used. The LRU information serves to identify an item that has been unused for the longest time. Specifically, the LRU information about a plurality of entries serves to indicate an order of oldness of these entries (i.e., an order of the time length during which these entries are not used).

The memory 31 stores first LRU information and second LRU information separately for each index. The first LRU information indicates an order of oldness of entries in each one of the caches 24 through 26, and the second LRU information indicates an order of oldness of entries through the entirety of the caches 24 through 26. Namely, the first LRU information is provided separately for each cache on an index-by-index basis. The first LRU information corresponding to a given cache and a given index indicates an order of oldness of the entries belonging to this given index in this given cache, such that the oldness is measured within this given cache. Further, the second LRU information is provided for the entirety of the caches 24 through 26 on an index-by-index basis. The second LRU information corresponding to a given index indicates an order of oldness of the entries belonging to this given index in these caches, such that the oldness is measured in the entirety of the caches.

As illustrated in operation S10 of FIG. 2, the entries corresponding to an accessed index may be all used in the self-core cache. In such a case, one of these cache entries may need to be evicted in order to allocate the accessed data. In this manner, when one of the cores 21 through 23 accesses the main memory 28, an entry of the index corresponding to the accessed item may need to be evicted from the cache corresponding to this accessing core. In such a case, the logic circuit 32 selects an entry to be evicted and a destination of the evicted entry in response to the first LRU information and the second LRU information. The embodiment of the present disclosures is not limited to the case of accessing the main memory 28. The embodiment of the present disclosures is applicable to the case in which accessing a lower-speed cache results in an entry of the index corresponding to the accessed address being to be evicted from the cache corresponding to the core.

Specifically, the logic circuit 32 selects, as an entry to be evicted, the oldest entry of the entries belonging to the index corresponding to the accessed address in the self-core cache according to the first LRU information. Further, the logic circuit 24 selects, as a destination of the entry to be evicted, the oldest entry of the entries belonging to the index corresponding to the accessed address in the caches 24 through 26 according to the second LRU information. The logic circuit 32 moves the evicted entry to the position of the selected destination entry, and discards the data (i.e., data that is the oldest of all) that has originally existed at the position of the destination entry. In the following, the eviction operation will be described in detail.

Figure 4:
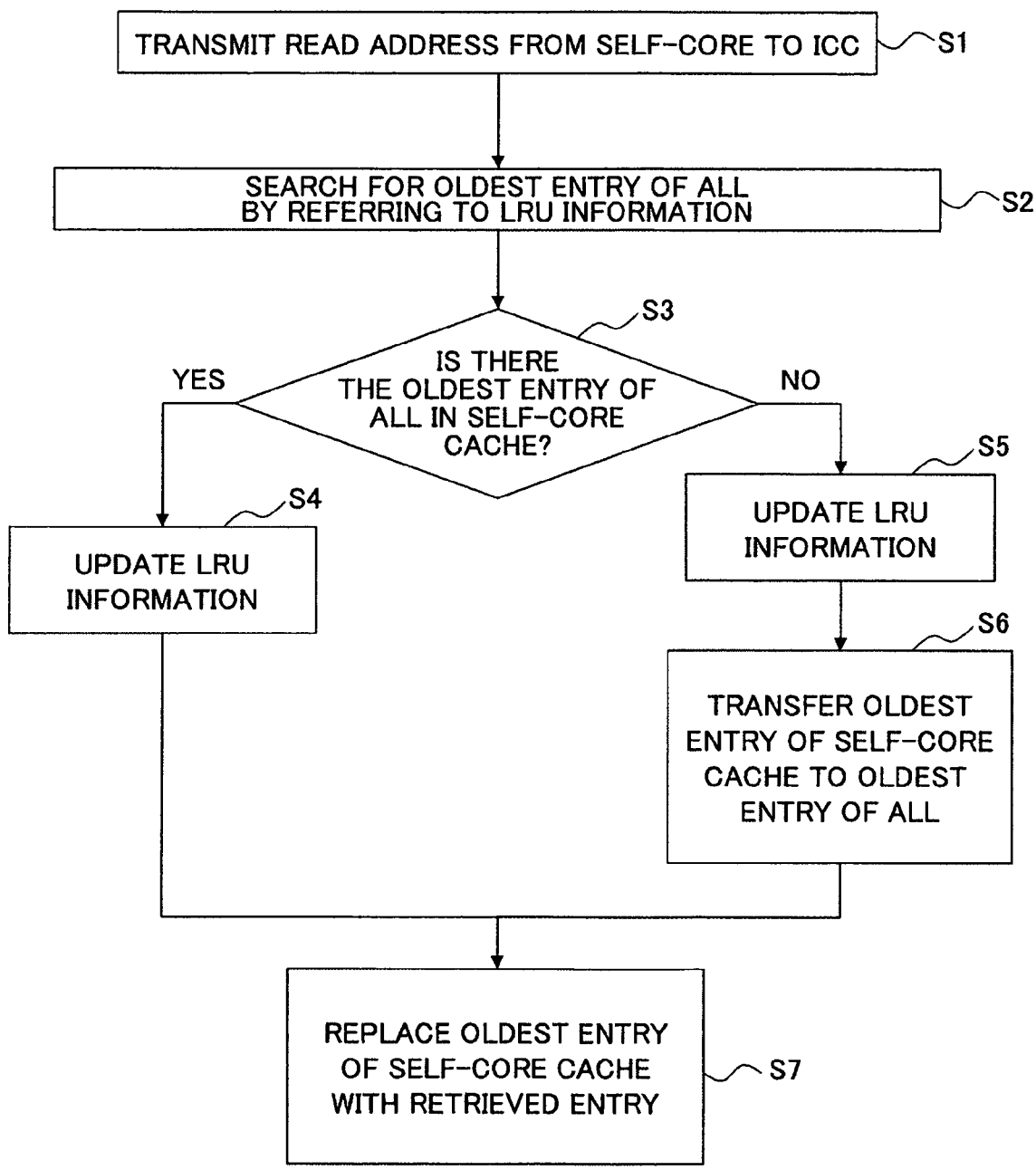
FIG. 4 is a flowchart illustrating the procedure of a cache entry eviction operation performed in the shared distributed cache system.

FIG. 4 is a flowchart illustrating the procedure of a cache entry eviction operation performed in the shared distributed cache system 20. The operation of FIG. 4 is supposed to be performed in operation S10 of FIG. 2. Namely, one of the cores 21 through 23 issues an access request to the cache (i.e., self-core cache) directly connected thereto, resulting in an occurrence of a cache miss in the self-core cache, followed by detecting an occurrence of a further cache miss at the lower level(s). Data is then read from the main memory 28 to be allocated to the self-core cache, which triggers the operation of the flowchart illustrated in FIG. 4. It is noted that the origin of data read in the operation of the flowchart illustrated in FIG. 4 does not have to be the main memory 28. The inter-cache connection controller 27 accesses the caches 24 through 26 in order of priority so as to organize a cache hierarchy. A memory that exists under this cache hierarchy and is managed as a unit separate from the caches serves as the origin of the read data. If the main memory 28 is positioned immediately under the cache hierarchy, such main memory 28 serves as the origin of the read data. In the following, a description will be given of the case of the main memory 28.

In operation S1 of FIG. 4, one of the cores 21 through 23 transmits an access address (e.g., a read address) to the inter-cache connection controller 27 in order to access the main memory 28. In operation S2, the second LRU information is checked to search for the oldest entry among the entries belonging to the index corresponding to the access address in the entirety of the caches 24 through 26.

In operation S3, a check is made as to whether the oldest entry of all is present in the self-core cache (i.e., the cache corresponding to the core that has issued the access request). If the oldest entry of all is present in the self-core cache, the first LRU information and the second LRU information are updated in operation S4. Namely, the first LRU information is updated such that the oldest entry in the self-core cache is changed to the newest entry, and the second LRU information is updated such that the oldest entry of all is changed to the newest entry. In subsequent operation S7, the data read from the main memory 28 is written to the oldest entry of the self-core cache (i.e., the entry that is changed to the newest entry through the LRU update).

If it is ascertained in operation S3 that the oldest entry of all is not present in the self-core cache, the first LRU information and the second LRU information are updated in operation S5. Namely, the first LRU information of the self-core cache is updated such that the oldest entry in the self-core cache is changed to the newest entry, and the first LRU information of the destination cache is updated such that the oldest entry (i.e., the oldest of all) in the destination cache to which the entry (i.e., evicted entry) evicted from the self-core cache is moved is set equal to the oldness sequence number of the evicted entry. Further, the second LRU information is updated such that the oldest entry of all becomes an entry having an oldness sequence number equal to the oldness sequence number of the evicted entry, and the oldest entry in the self-core cache is changed to the newest entry.

In subsequent operation S6, the oldest entry in the self-core cache is transferred (i.e., moved) to the oldest entry of all. In the last operation S7, the data read from the main memory 28 is written to the oldest entry of the self-core cache (i.e., the entry that is changed to the newest entry through the LRU update).

Figure 5:
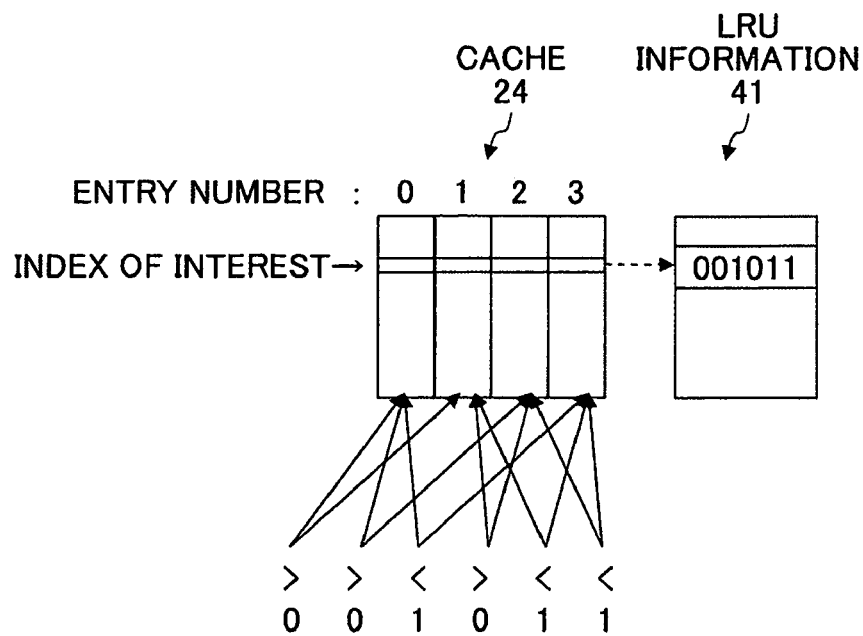
FIG. 5 is a drawing illustrating a first embodiment of first LRU information.

FIG. 5 is a drawing illustrating a first embodiment of the first LRU information. Although FIG. 5 demonstrates the cache 24, a similar argument applies in the case of the remaining caches 25 and 26.

The case of using a 4-way cache is illustrated in FIG. 5 as an example. Four entries are in existence with respect to each of the indexes of the cache 24. Individual entries are identified by entry numbers 0, 1, 2, and 3. First LRU information 41 corresponding to the cache 24 includes data indicative of an order of oldness of the four entries with respect to each one of the indexes. For example, the first LRU information 41 about an index of interest may include "001011".

The first LRU information 41 in this case is a code indicative of an order of oldness in terms of binary relationship. The first digit (i.e. leftmost digit) "0" in "001011", for example, indicates that the entry of entry number 1 is older than the entry of entry number 0 in terms of comparison between the entry of entry number 0 and the entry of entry number 1 as illustrated. The second digit (i.e. second from the left) "0" in "001011", for example, indicates that the entry of entry number 2 is older than the entry of entry number 0 in terms of comparison between the entry of entry number 0 and the entry of entry number 2 as illustrated. The third digit (i.e. third from the left) "1" 1 in "001011", for example, indicates that the entry of entry number 0 is older than the entry of entry number 3 in terms of comparison between the entry of entry number 0 and the entry of entry number 3 as illustrated. In a similar manner, each bit of "001011" of the first LRU information 41 indicates which one of the two entries subjected to comparison is older than the other.

An order of oldness of all the entries may be known by using "0" and "1" to indicate an order of oldness for all the binary relationships between the entries (i.e., all the combinations of two entries selected from the set of all the entries). In the example illustrated in FIG. 5, the entry numbers are arranged as 2, 1, 0, 3 in an order of oldness.

Figure 6:
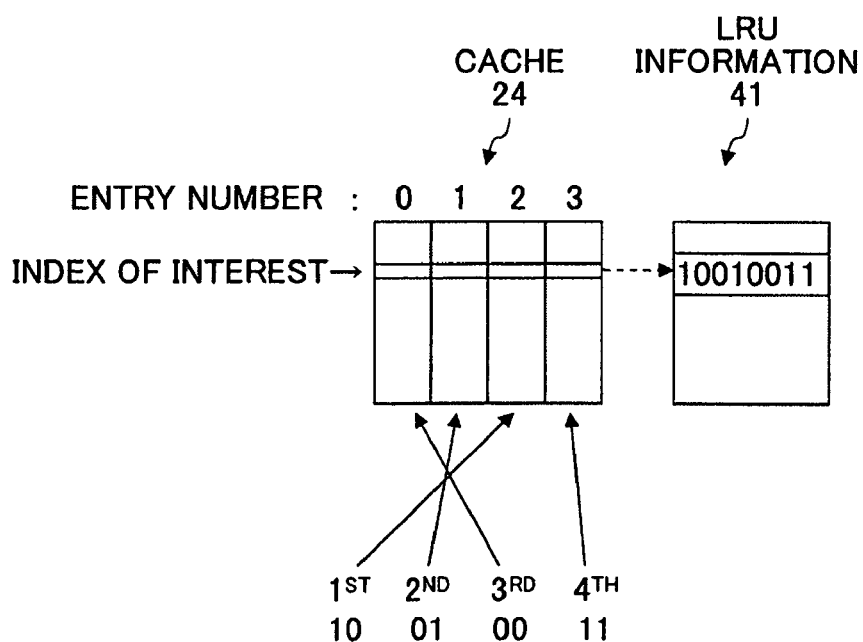
FIG. 6 is a drawing illustrating a second embodiment of the first LRU information.

FIG. 6 is a drawing illustrating a second embodiment of the first LRU information. Although FIG. 6 demonstrates the cache 24, a similar argument applies in the case of the remaining caches 25 and 26.

The case of using a 4-way cache is illustrated in FIG. 6 as an example. Four entries are in existence with respect to each of the indexes of the cache 24. Individual entries are identified by entry numbers 0, 1, 2, and 3. First LRU information 41 corresponding to the cache 24 includes data indicative of an order of oldness of the four entries with respect to each one of the indexes. For example, the first LRU information 41 about an index of interest may include "10010011".

The first LRU information 41 "10010011" are four two-bit codes indicative of respective entries. An arrangement of these codes indicates an order of oldness (i.e., the leftmost code indicates the oldest entry). The first two bits (i.e., the leftmost code) "10" in "100100111" are the code that identifies the oldest entry, and indicate the entry of entry number 2 (which is "10" in binary representation). The second two bits "10" in "10010011" are the code that identifies the second oldest entry, and indicate the entry of entry number 1 (which is "01" in binary representation). Similarly, the third two bits "00" in "10010011" are the code that identifies the third oldest entry, and indicate the entry of entry number 0 (which is "00" in binary representation). Further, the fourth two bits "11" in "10010011" are the code that identifies the fourth oldest entry, and indicate the entry of entry number 3 (which is "11" in binary representation).

The codes as described above may directly represent an order of oldness of all the entries. In the example illustrated in FIG. 6, the entry numbers are arranged as 2, 1, 0, 3 in an order of oldness.

Figure 7:
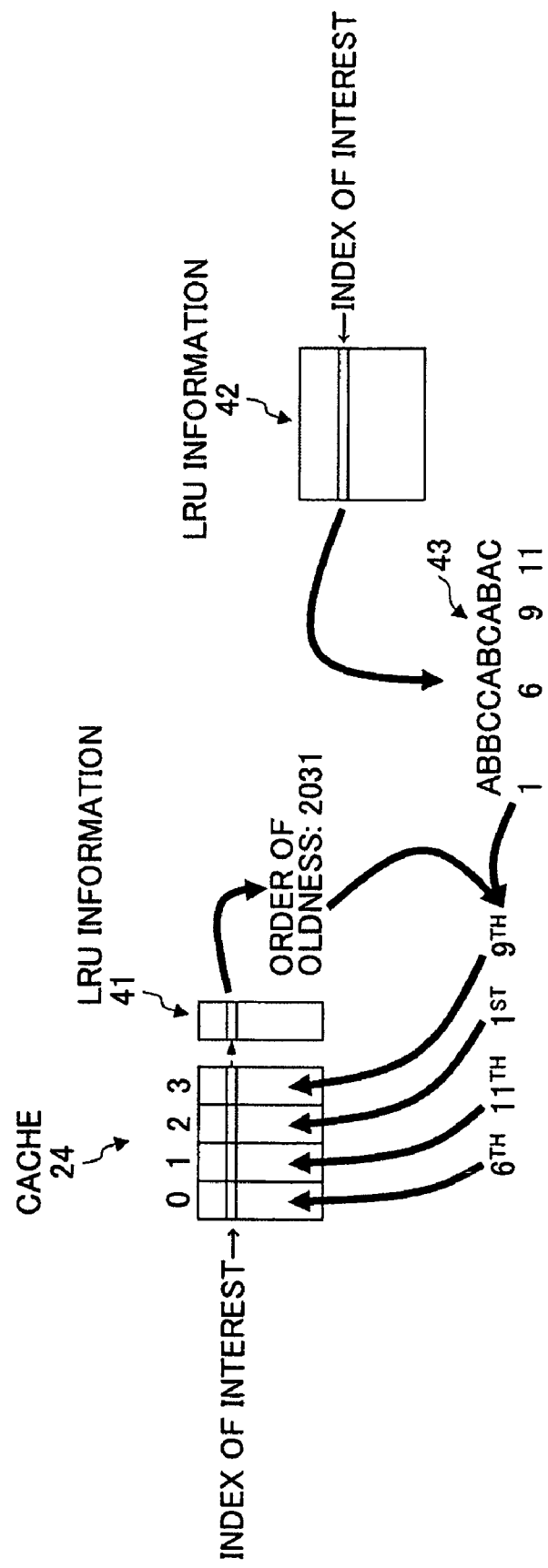
FIG. 7 is a drawing illustrating an embodiment of second LRU information.

FIG. 7 is a drawing illustrating an embodiment of the second LRU information. Although FIG. 7 demonstrates the cache 24, a similar argument applies in the case of the remaining caches 25 and 26.

The case of using a 4-way cache is illustrated in FIG. 7 as an example. Four entries are in existence with respect to each of the indexes of the cache 24. Individual entries are identified by entry numbers 0, 1, 2, and 3. First LRU information 41 corresponding to the cache 24 includes data indicative of an order of oldness of the four entries with respect to each one of the indexes. For example, the first LRU information 41 about an index of interest indicates that the order of oldness of the entries is 2, 0, 3, 1 as expressed by use of entry numbers. The first LRU information 41 may be the codes as illustrated in FIG. 5, or may be the codes as illustrated in FIG. 6.

Further, second LRU information 42 is provided for the entirety of the caches 24 through 26. The second LRU information 42 indicates an order of oldness of entries with respect to each index that are present in the caches 24 through 26, such that the oldness is measured for the entire set. Namely, each cache may include four entries for each index, and there may be three caches 24 through 26. In such a case, the second LRU information 42 indicates an order of oldness of twelve entries (i.e., 4×3 entries) with respect to each index.

In an example illustrated in FIG. 7, the first LRU information 42 about an index of interest may be "ABBCCAB-CABAC". Each of the alphabets A, B, and C is a code that indicates one of the caches 24 through 26. In this example, A represents the cache 24, B representing the cache 25, and C representing the cache 26. Although one alphabet is used as a code for the sake of convenience of explanation, any codes may be used as long as they may identify three caches. For example, two-bit codes may be used.

The second LRU information 42 "ABBCCABCABAC" includes 12 letters corresponding to 12 entries. The leftmost letter corresponds to the oldest entry, for example, with the rightmost letter corresponding to the newest entry. Namely, the oldest entry is the entry of the cache A (i.e., cache 24), the second oldest entry being that of the cache B (i.e., cache 25), the third oldest entry being that of the cache B (i.e., cache 25), and the fourth oldest entry being that of the cache C (i.e., cache 26).

This arrangement only identifies caches that include entries arranged in an order of oldness. With such an arrangement, the four entries of the cache 24, for example, may be identified as the oldest entry of all, the sixth oldest entry of all, the ninth oldest entry of all, and the eleventh oldest entry of all. Namely, "A" appears at the first position, sixth position, ninth position, and eleventh position in the example illustrated in FIG. 7.

once the oldness sequence numbers in the entire set are known for the four unspecified entries of the cache 24, an oldness sequence number in the entire set may be identified for each specific entry of the cache 24. Namely, the first LRU information 41 of the cache 24 indicates that the order of oldness is 2, 0, 3, 1 as expressed by entry numbers. Accordingly, it may be ascertained that the entry of entry number 2 is the oldest of all, the entry of entry number 0 being the sixth oldest of all, the entry of entry number 3 being the ninth oldest of all, and the entry of entry number 1 being the eleventh oldest of all.

In this manner, the second LRU information 42 may arrange codes indicative of respective caches, such that the caches are arranged in an order of oldness of their corresponding entries, without identifying individual entries. This makes it possible to efficiently represent an order of oldness of all the entries by use of a small amount of data Namely, the first LRU information 41 represents an order of oldness of specified entries in each cache, and the second LRU information 42 represents an order of oldness of unspecified entries in the entire set by identifying only the caches. The first LRU information 41 and the second LRU information 42 may then be combined to identify an order of oldness of specified entries in the entire set. With this provision, an order of oldness in the entire set may be represented efficiently by use of a small amount of data.

As an example, the number of bits for each item of the first LRU information 41 that employs binary-relationship-based representation may be equal to $_nC_2$, which is the number of combinations of two items selected from n items when n represents the number of ways in one cache. In the case of m caches, the number of bits equal to $m \times_n C_2$ may be necessary for the entirety of the first LRU information 41. When the second LRU information 42 is represented in the manner as previously described, $\log_2(m)$ bits may be necessary for a code to identify each cache, and n×m such codes may be necessary when the total number of ways is n×m. Consequently, the number of bits for the first LRU information 41 and the second LRU information 42 may be represented as follows.

$$m \times_n C_2 + \log_2(m) \times n \times m \qquad (1)$$

If the number (m) of caches is 2, and the number (n) of ways is 4, the value of the expression (1) is equal to 20 (bits). If the number (m) of caches is 4, and the number (n) of ways is 4, the value of the expression (1) is equal to 56 (bits).

Alternatively, the entire set comprised of 8 ways may be represented by use of the binary-relationship-based representation (i.e., the method illustrated in FIG. 5) when the number (m) of caches is 2, and the number (n) of ways is 4. In this case, 28 bits may be necessary. Alternatively, the entire set may be represented by use of the sequence-based representation (i.e., the method illustrated in FIG. 6). In such a case, 24 bits, which is equal to $\log_2(8) \times 8$, may be necessary. Moreover, the entire set comprised of 16 ways may be represented by use of the binary-relationship-based representation when the number (m) of caches is 4, and the number (n) of ways is 4. In this case, 120 bits may be necessary. Further, the entire set may be represented by use of the sequence-based representation. In such a case, 64 bits, which is equal to 1092 (16)×16, may be necessary.

In the present disclosures, the first LRU information 41 may use binary relationship to express an order of oldness, and the second LRU information 42 may only identify caches to express an order of oldness for unspecified entries in the entire set. This arrangement may significantly reduce the number of bits for the LRU information.

Figure 8:
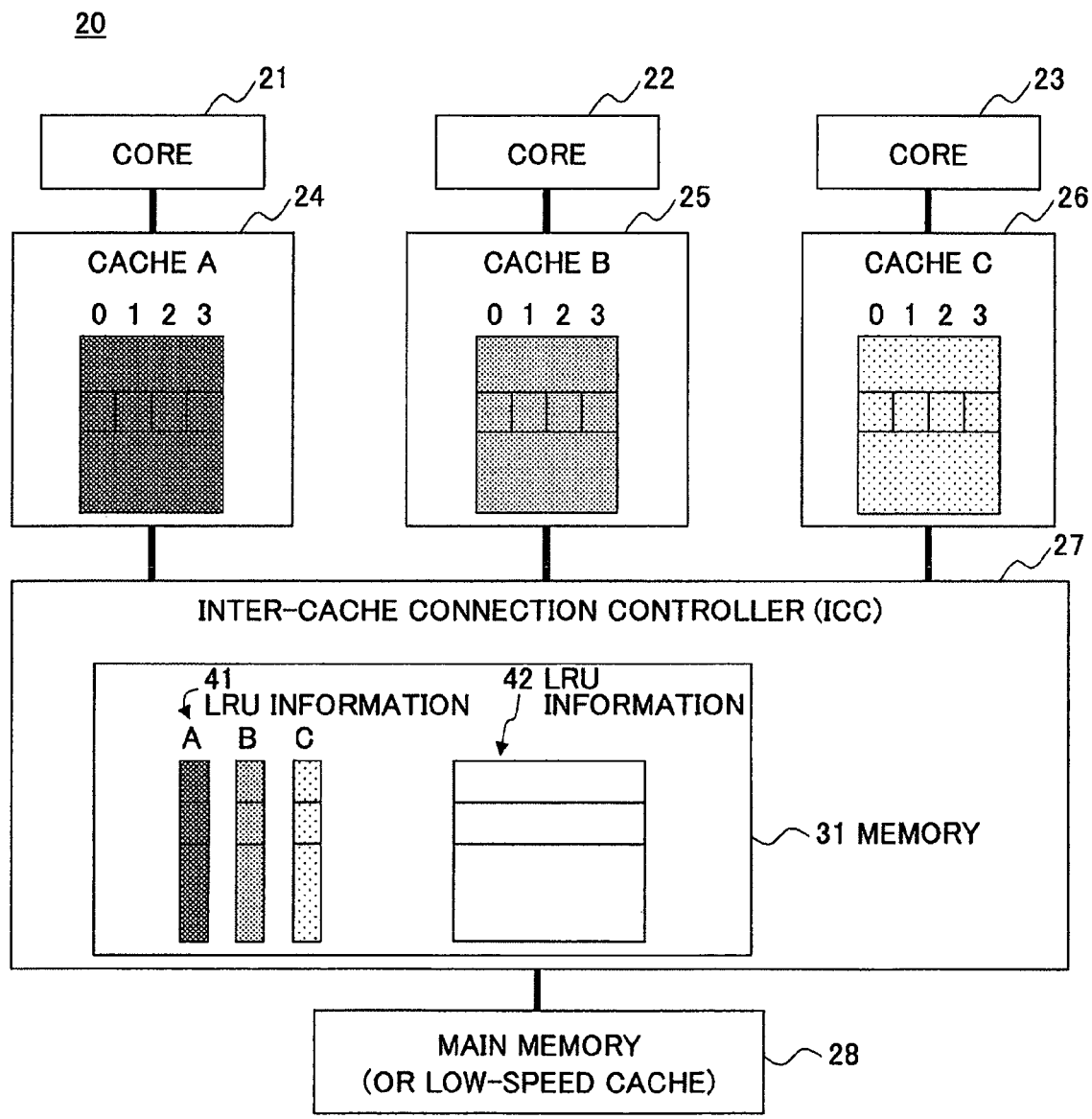
FIG. 8 is a drawing for explaining a storage place of the first LRU information and the second LRU information.

FIG. 8 is a drawing for explaining a storage place of the first LRU information 41 and the second LRU information 42. In FIG. 8, similar elements to those of FIG. 3 are referred to by similar numerals, and a description thereof will be omitted.

As illustrated in FIG. 8, the first LRU information 41 and the second LRU information 42 are stored in the memory (i.e., register) 31 provided in the inter-cache connection controller 27. Namely, the inter-cache connection controller 27 centrally manages the first LRU information 41 (item A, item B, and item C), which correspond to the caches 24 through 26 (i.e., cache A, cache B, and cache C), respectively. The second LRU information 42 that represents an order of oldness in the entire set is also managed by the inter-cache connection controller 27 together with the first LRU information 41. With this provision, the inter-cache connection controller 27 may complete a check and update of the first LRU information 41 and the second LRU information 42 in one cycle as viewed from outside.

Figure 9:
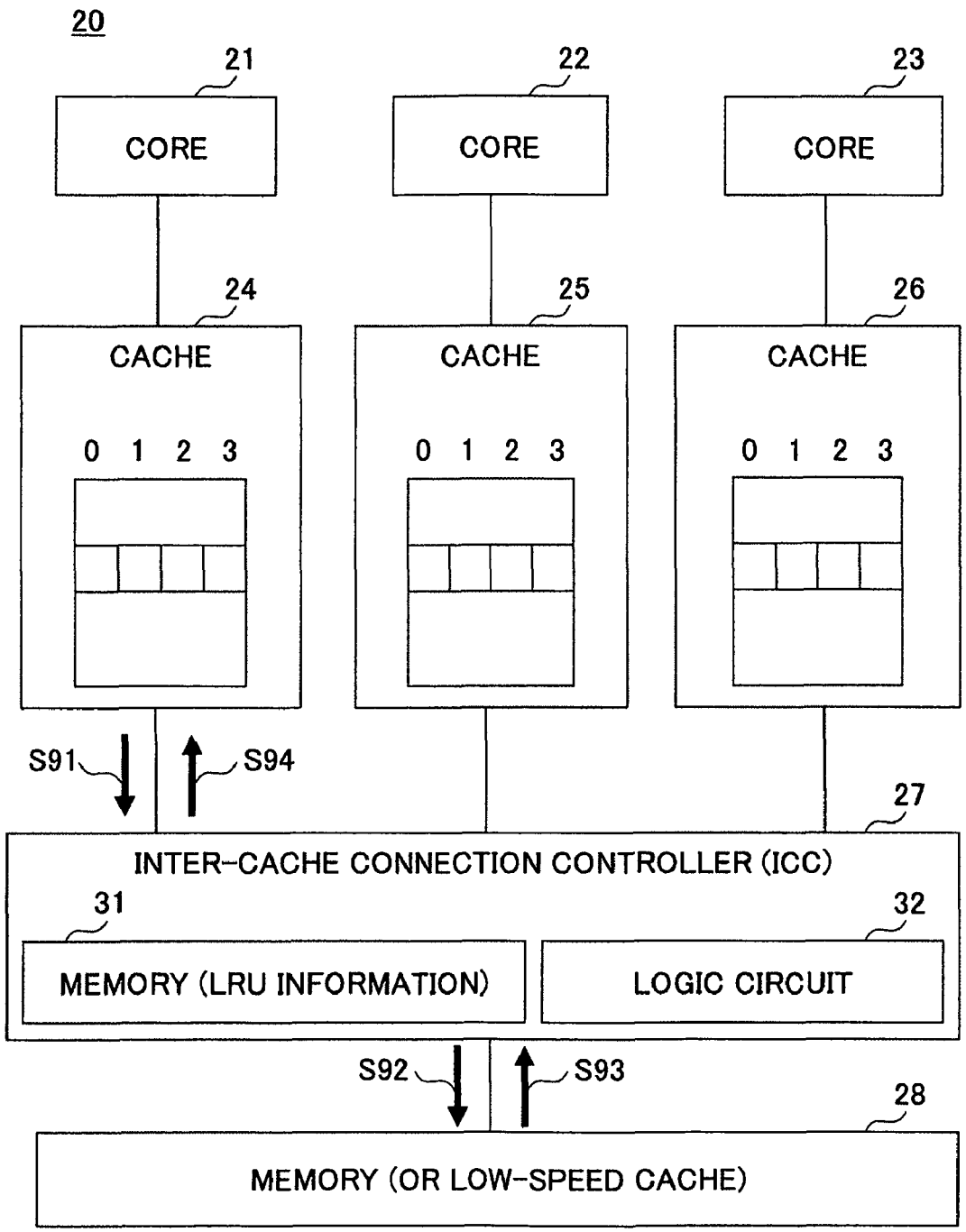
FIG. 9 is a drawing for explaining an operation of discarding an evicted entry.

FIG. 9 is a drawing for explaining an operation of discarding an evicted entry. The operation illustrated in FIG. 9 corresponds to operations S1, S2, S3, S4, and S7 in the flowchart of FIG. 4. FIG. 10 is a drawing illustrating the relationship between each operation of the operation of FIG. 9 and system clock cycles. The shared distributed cache system 20 of the present disclosures operates in synchronization with a system clock as illustrated in FIG. 10.

As indicated as operation S91 in FIG. 9, the self-core cache 24 transmits an access address to the inter-cache connection controller 27. This is performed by taking one cycle in the first cycle as illustrated in FIG. 10.

The inter-cache connection controller 27 then determines that an evicted entry is to be discarded based on the operations of operations S2 and S3 illustrated in FIG. 4. The inter-cache connection controller 27 updates the LRU information, and requests data from the main memory 28 as indicated by operation S92 in FIG. 9. These operations corresponding to the search of the oldest entry of all, the update of the LRU information, and the data request to the memory are performed by taking one cycle in the second cycle as illustrated in FIG. 10.

After this, as indicated by operation S93 in FIG. 9, the inter-cache connection controller 27 receives data from the main memory 28. Further, as indicated by operation S94, the inter-cache connection controller 27 transfers the data to the cache 24. In so doing, several hundred cycles pass from the data request to the memory to the receipt of the data as illustrated in FIG. 10. Thereafter, the receipt of data from the memory and transmission of the data to the cache 24 (i.e., self-core cache) are performed by the inter-cache connection controller 27 by taking four cycles, for example. It takes 4 cycles for the cache 24 (i.e., self-core cache) to receive the data from the inter-cache connection controller 27.

Figures 11, 12:
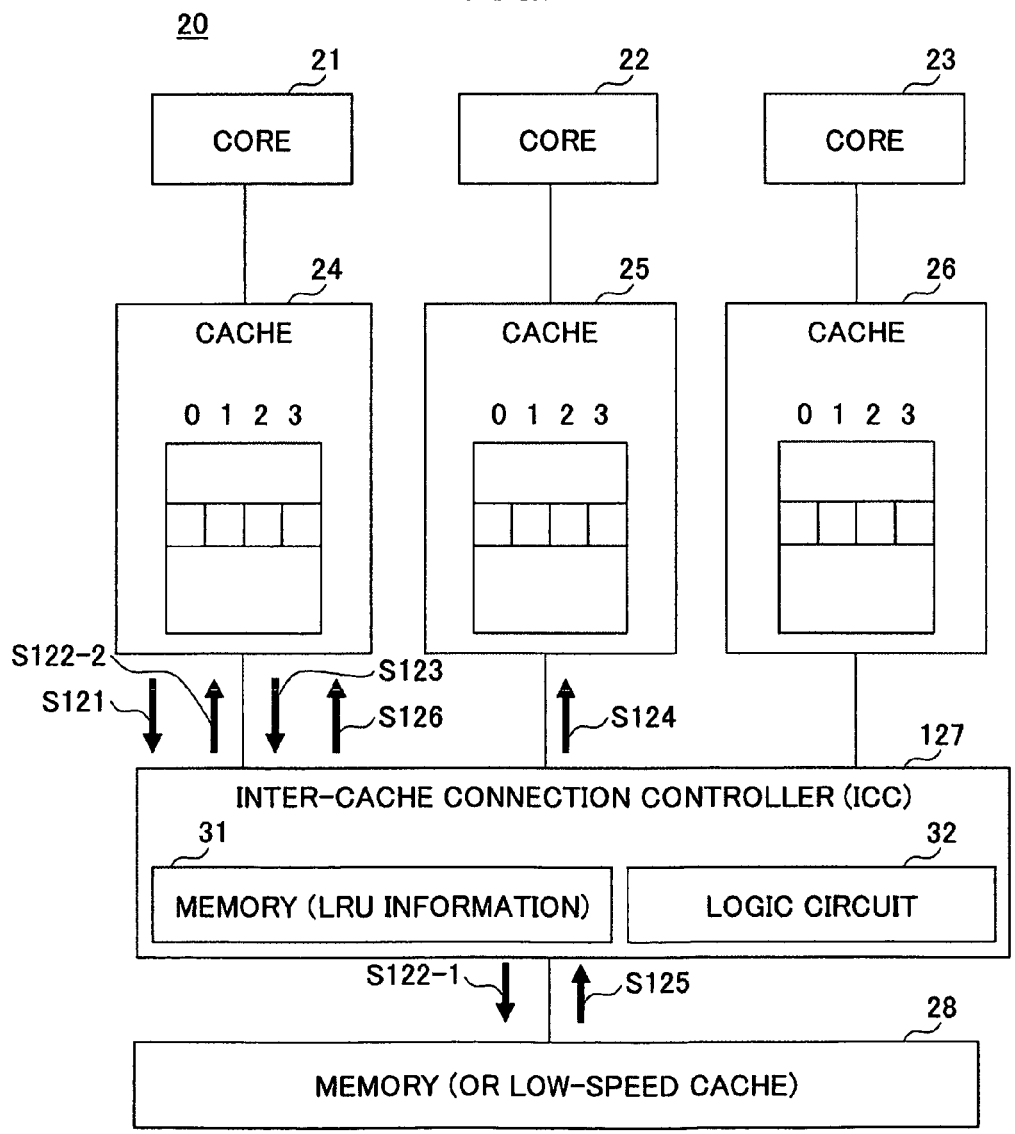
FIG. 11 is a drawing for explaining an update of the LRU information in the case of discarding an evicted entry.
FIG. 12 is a drawing for explaining an operation of transferring an evicted entry.

FIG. 11 is a drawing for explaining an update of the LRU information in the case of discarding an evicted entry. FIG. 11 illustrates an updating operation performed with respect to the first LRU information 41 and an updating operation performed with respect to the second LRU information 42 in the case of discarding an evicted entry. The contents of the first LRU information 41 regarding the self-core cache are updated such that the oldest entry in the self-core cache is indicated as the newest entry. Moreover, the contents of the second LRU information 42 are updated such that the oldest entry of all in the entire set is indicated as the newest entry.

FIG. 12 is a drawing for explaining an operation of transferring an evicted entry. The operation illustrated in FIG. 12 corresponds to operations S1, S2, S3, S5, S6, and S7 in the flowchart of FIG. 4. FIG. 13 is a drawing illustrating the relationship between each operation of the operation of FIG. 12 and the system clock. The shared distributed cache system 20 of the present disclosures operates in synchronization with a system clock as illustrated in FIG. 13.

As indicated as operation S121 in FIG. 12, the self-core cache 24 transmits an access address to the inter-cache connection controller 27. This is performed by taking one cycle in the first cycle as illustrated in FIG. 13.

The inter-cache connection controller 27 then determines that an evicted entry is to be transferred based on the operations of operations S2 and S3 illustrated in FIG. 4. The inter-cache connection controller 27 updates the LRU information, and requests data from the main memory 28 as indicated by operation S122-1 in FIG. 12. Further, the inter-cache connection controller 27 requests the cache 24 to provide data indicative of the oldest entry in the cache, as indicated by operation S122-2 in FIG. 12. These operations corresponding to the search of the oldest entry of all, the update of the LRU information, the data request to the memory, and the request of data indicative of the oldest data to the self-core cache (i.e., the cache 24) are performed by taking one cycle in the second cycle as illustrated in FIG. 13.

Subsequently, as indicated by operation S123 in FIG. 12, the cache 24 transmits the data indicative of the oldest entry in the self-core cache to the inter-cache connection controller 27. This operation is performed by taking four cycles from the third cycle to the sixth cycle as illustrated in FIG. 13. Further, the inter-cache connection controller 27 transfers the data indicative of the oldest entry in the cache 24 to the cache 25 (i.e., another core cache), as indicated by operation S124 in FIG. 12. Such another core cache 25 is the cache that has the oldest entry of all, and serves as a destination for the evicted entry. This operation is performed by taking four cycles from the fourth cycle to the seventh cycle as illustrated in FIG. 13. As illustrated in FIG. 13, further, the replacement of the oldest entry of all in the core cache 25 by the oldest entry of the self-core cache 24 is performed by taking four cycles from the fifth cycle to the eighth cycle.

After this, as indicated by operation S125 in FIG. 12, the inter-cache connection controller 27 receives data from the main memory 28. Further, as indicated by operation S126, the inter-cache connection controller 27 transfers the data to the cache 24. In so doing, several hundred cycles pass from the data request to the memory to the receipt of the data as illustrated in FIG. 13. Thereafter, the receipt of data from the memory and transmission of the data to the cache 24 (i.e., self-core cache) are performed by the inter-cache connection controller 27 by taking four cycles, for example. It takes 4 cycles for the cache 24 (i.e., self-core cache) to receive the data from the inter-cache connection controller 27.

FIG. 14 is a drawing for explaining an update of the LRU information in the case of transferring an evicted entry. FIG. 14 illustrates an updating operation performed with respect to the first LRU information 41 of the self-core cache, an updating operation performed with respect to the first LRU information 41 of another core cache, and an updating operation performed with respect to the second LRU information 42 in the case of discarding an evicted entry.

The contents of the first LRU information 41 regarding the self-core cache are updated such that the oldest entry in the self-core cache is indicated as the newest entry. With respect to the first LRU information 41 regarding another core cache, an oldness sequence number, as measured in terms of oldness in such another core cache, of the oldest entry (i.e., evicted entry) in the self-core cache is computed based on the first LRU information 41 and the second LRU information 42. The contents of the first LRU information 41 of such another core cache are then updated such that the oldest entry in such another core cache (i.e., the oldest entry of all in the entire set) is indicated as having a next smaller sequence number (i.e., next older number) than the oldness sequence number as computed above. Further, the contents of the second LRU information 42 is updated such that the oldest entry of all becomes an entry having an oldness sequence number next older than the oldness sequence number of the oldest entry in the self-core cache (i.e., evicted entry), and the oldest entry in the self-core cache is changed to the newest entry.

The reason why the next older sequence number is used in the above-described operation is because reading the newest entry from the memory upon discarding the oldest entry results in the oldness sequence numbers of all the entries being sifted by one toward smaller sequence numbers (i.e., older sequence numbers). FIG. 15 through FIG. 17 are drawings for explaining the above-described LRU update operation.

FIG. 15 is a drawing illustrating the way all the entries of an index of interest are arranged in an order of oldness as defined with respect to the entire set. An alphabet letter identifies a cache, and a one digit numeral that follows indicates an entry number within the relevant cache. The line of entries illustrated on the upper row in FIG. 15 indicates the entries prior to an update, and the line of entries illustrated on the lower row indicates the entries after the update. In each entry line, the leftmost entry is the oldest, and the rightmost entry is the newest. Namely, in the entry line illustrated on the upper row of FIG. 15, entry A0 that is the entry of entry number 0 in the cache A (i.e., the cache 24) is the oldest of all, and entry B2 that is the entry of entry number 2 in the cache B (i.e., the cache 25) is the oldest in the cache B.

In the case that will be considered below, the cache B is the self-core cache. In this case, the content of the entry A0 that is the oldest of all is discarded, and the data read from the memory (i.e., the newest data) is written to the position of the entry B2 that is the evicted entry (i.e., the oldest entry in the cache B). Accordingly, the entry A0 that is the leftmost in the entry line is deleted, and the entry B2 is added to the right-hand-side end of the entry line, with the remaining entries being shifted to the left by one position slot as indicated by arrows. Namely, the order of oldness of each entry is updated to the next older sequence position.

In so doing, the original data of the entry B2 which is replaced with the data read from the memory (i.e., the newest data) is evicted from the cache B as evicted data, and is moved to the position of the entry A0 that is the oldest of all. This is indicated by a dotted arrow in FIG. 15. As a result, the entry A0 that is the oldest of all becomes an entry having a sequence number matching the oldness sequence number of the evicted entry B2 of the self-core cache B (i.e., the sequence number that is next smaller than the oldness sequence number of the original entry B2).

In this procedure, the first LRU information 41 of the cache A will be taken into account as follows. Prior to the update, the entry B2 and the entries of the cache A are arranged in an order of oldness as follows: A0, A2, B2, A1, and A3. The entry B2 is thus the third oldest one. When the entry B2 is moved to the cache A, the oldest data that is the content of the oldest entry A0 is discarded and replaced with the data content of the entry B2. Since the oldest data is discarded, the sequence number of the entry A0 upon its update becomes equal to a next smaller sequence number (i.e., second) than the sequence number (i.e., third) of the entry B2. This is what is described in the field of an updating operation with respect to the first LRU information 41 regarding another-core cache in FIG. 14.

It is noted that since A0 is to be discarded, the entry B2 and the updated entries of the cache A, excluding A0, are arranged in an order of oldness as follows: A2, B2, A1, and A3. Namely, the entry B2 is the second oldest in the cache A. With this interpretation, it may be reasonable to purport that the oldest entry A0 (i.e., the oldest entry of all) in the destination cache (i.e., another core cache) is updated to a sequence number equal to the oldness sequence number of the evicted entry B2.

FIG. 16A is a drawing illustrating the way the second LRU information 42 is updated with respect to another core cache A, and FIG. 16B is a drawing illustrating the way the second LRU information 42 is updated with respect to the self-core cache B. The examples illustrated in FIGS. 16A AND 16B correspond to the order of entries illustrated in FIG. 15.

As demonstrated in FIG. 16A, the oldest entry of another core cache A (i.e., entry number 0 illustrated in a dark halftone: A0 of FIG. 15) is the oldest entry of all in the entire set, and is replaced with the content of the entry B2. Consequently, the first LRU information 41 having the order of oldness as represented by entry numbers 0, 2, 1, and 3 prior to the update is changed to the first LRU information 41 having the order of oldness as follows: 2, 0, 1, and 3.

As demonstrated in FIG. 16B, the oldest entry of the self-core cache B (i.e., entry number 2 illustrated in a dark halftone: B2 of FIG. 15) is the oldest entry in the cache B, and is replaced with the data read from the memory. Consequently, the first LRU information 41 having the order of oldness as represented by entry numbers 2, 3, 0, and 1 prior to the update is changed to the first LRU information 41 having the order of oldness as follows: 3, 0, 1, and 2.

FIG. 17 is a drawing illustrating a change in the second LRU information 42 in the case of entries being updated upon data movements as illustrated in FIG. 15. The upper row of FIG. 17 indicates the second LRU information 42 prior to the update, and the lower row indicates the second LRU information 42 after the update. As was described in connection with FIG. 7, the second LRU information 42 is comprised of information items (i.e., codes) identifying respective caches arranged in an order of oldness of corresponding entries. Namely, the second LRU information 42 illustrated on the upper row of FIG. 17 is obtained by removing the entry numbers 0, 1, 2, and 3 from the entry line illustrated on the upper row of FIG. 15, and the second LRU information 42 illustrated on the lower row of FIG. 17 is obtained by removing the entry numbers 0, 1, 2, and 3 from the entry line illustrated on the lower row of FIG. 15. Updating operations are substantially similar to those described in connection with FIG. 15.

As described in the above-disclosed embodiments, data is read from the main memory 28 upon an access request issued from the cores 21 through 23 to the main memory 28, and is transferred to the cache (i.e., self-core cache) corresponding to the core that issued the request. When plural access requests conflict with each other, queuing may be used to cope with such conflicts. Namely, a queue (i.e., FIFO) may be provided to store plural requests in the inter-cache connection controller 27. Requests are then written to the queue for successive processing in the order of arrival.

As previously described, the LRU operations (i.e., an LRU check operation and an LRU update operation) are performed by taking one cycle in the second cycle. It follows that plural requests do not conflict and may be processed in a routine manner as long as these requests are staggered by one cycle with each other. If plural requests are issued in the same cycle, however, processing based on queuing may become necessary.

As previously described, a data transfer operation generally takes a plurality of cycles. Conflicts may thus occur not only when plural requests are concurrently issued in the same cycle but also when plural requests are staggered with each other to some extent. In such a case, processing based on queuing may become necessary.

According to at least one embodiment of the present disclosures, the first information indicative of an order of oldness of entries in each cache and the second information indicative of an order of oldness of entries for the entirety of caches are provided. When data is to be transferred from the memory or lower-level cache to the self-core cache, an entry to be evicted and a destination of the evicted entry are determined in response to the first information and the second information, thereby performing an efficient eviction operation of a cache entry.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A cache system, comprising:
   a plurality of processing units operative to access a main memory device or lower-level cache;
   a plurality of caches coupled in one-to-one correspondence to the processing units; and
   a controller coupled to the caches to control data transfer between the caches and data transfer between the main memory or the lower-level cache and the caches,
   wherein the controller includes:
      a memory configured to store first information and second information separately for each of a corresponding index, the first information indicating a recently used order of entries in each one of the caches, and the second information indicating a recently used order of entries for the plurality of the caches, and
      a logic circuit configured to select an entry to be evicted, based on the first information and the second information,
   wherein when a first cache, corresponding to a first processing unit of the plurality of units which sends an address to the controller, does not include a first entry which is least recently used among the plurality of caches, the logic circuit transfers a second entry which is least recently used in the first cache to a second cache which includes an entry that is least recently used among the plurality of caches, the second cache corresponding to a second processing unit of the plurality of the processing units, and
   wherein the first information includes for each of the caches:
      information indicating which of at least two entries is an oldest entry by considering all combinations of the two entries selected from all entries belonging to one index of a given cache.

2. The cache system as claimed in claim 1, wherein the logic circuit is configured
   to select a least recently used cache entry as the entry to be evicted according to the first information, the least recently used cache entry being least recently used among entries belonging in the corresponding cache and belonging to an index corresponding to an accessed address, and
   to select a least recently used entry of all according to the second information, the least recently used entry of all being least recently used among entries belonging in the caches and belonging to the index corresponding to the accessed address, and
   wherein the logic circuit moves the evicted entry to a position of the least recently used entry of all.

3. The cache system as claimed in claim 1, wherein the logic circuit is configured to update the first information of the corresponding cache such that the least recently used entry of the corresponding cache is changed to a most recently used entry, to update the first information of a destination cache to which the evicted entry is moved such that the least recently used entry of all that is also least recent used in the destination cache is set equal to a recently used sequence number of the evicted entry, and to update the second information such that the least recently used entry of all becomes an entry having a recently used sequence number equal to the recently used sequence number of the evicted entry, and the least recently used entry of the corresponding cache is changed to the most recently used entry.

4. The cache system as claimed in claim 1, wherein the logic circuit is configured to select a least recently used entry of all according to the second information, the least recently used entry of all being least recently used among entries belonging in the caches and belonging to the index corresponding to an accessed address, and to replace the least recently used entry of all with data read from the main memory device if the least recently used entry of all belongs to the corresponding cache.

5. The cache system as claimed in claim 4, wherein the first information of the corresponding cache is updated such that the least recently used entry of all in the corresponding cache is changed to a most recently used entry, and the second information is updated such that the least recently used entry of all is changed to the most recently used entry.

6. The cache system as claimed in claim 1, wherein the logic circuit is configured to perform a check and update of the first information and the second information together in one cycle.

7. A cache system, comprising:

a plurality of processing units operative to access a main memory device or lower-level cache;

a plurality of caches coupled in one-to-one correspondence to the processing units; and a controller coupled to the caches to control data transfer between the caches and data transfer between the main memory or the lower-level cache and the caches, wherein the controller includes:

a memory configured to store first information and second information separately for each of a corresponding index, the first information indicating a recently used order of entries in each one of the caches, and the second information indicating a recently used order of entries for the plurality of the caches, and a logic circuit configured to select an entry to be evicted, based on the first information and the second information, wherein when a first cache, corresponding to a first processing unit of the plurality of units which sends an address to the controller, does not include a first entry which is least recently used among the plurality of caches, the logic circuit transfers a second entry which is least recently used in the first cache to a second cache which includes an entry that is least recently used among the plurality of caches, the second cache corresponding to a second processing unit of the plurality of the processing units, and wherein the second information includes:

codes indicative of respective caches that are arranged in a recently used order of entries without identifying individual entries, thereby representing a recently used order of all the entries in the plurality of caches.

* * * * *